Nov. 19, 1957     D. W. KELBEL ET AL     2,813,437
PLANETARY GEAR DESIGN
Filed Sept. 25, 1956
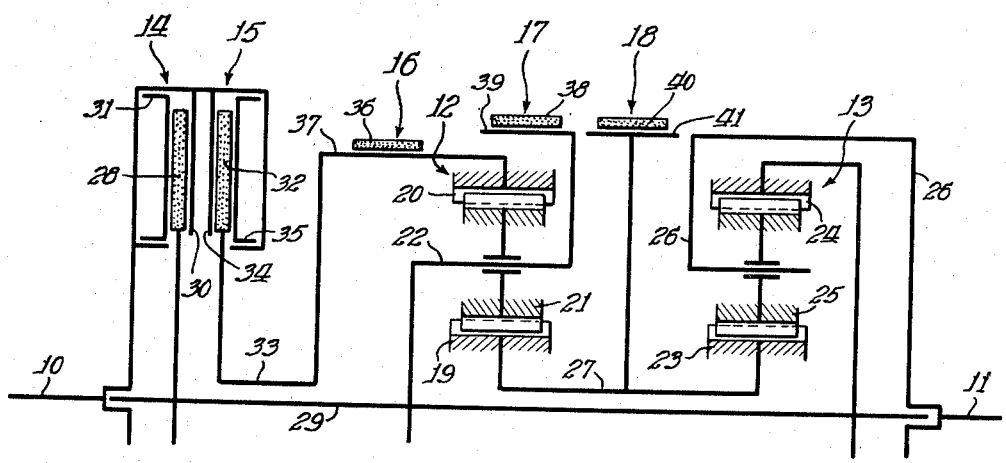
Inventors:
Palmer Orr and
Donald W. Kelbel
By:
Keith J. Blewer   Atty

United States Patent Office 2,813,437
Patented Nov. 19, 1957

2,813,437

PLANETARY GEAR DESIGN

Donald W. Kelbel and Palmer Orr, Muncie, Ind., assignors to Borg-Warner Corporation, Chicago, Ill., a corporation of Illinois Application September 25, 1956, Serial No. 611,992

11 Claims. (Cl. 74—759)

This invention relates to transmissions particularly adapted for use in automotive vehicles.

It is an object of the present invention to so interconnect two planetary gear sets to provide four forward speed drives and a drive in reverse between the drive shaft and the driven shaft.

Another object of the invention is to achieve these speed ratios by the use of a minimum number of friction clutches and brakes. Only two friction clutches and three friction brakes are needed in the whole system.

It is another object of the invention to complete any one of the desired ratios by engaging only two friction devices. In each of the different speed ratios except direct drive one clutch and one brake are engaged. In direct drive two clutches are engaged.

Still another object of the invention is to provide a transmission in which it will be necessary to engage only one new friction device in shifting from one ratio to another while at the same time disengaging one friction device. It is contemplated that the use of only two friction devices to complete a desired speed ratio and engaging only one different friction device in up-shifting or down-shifting between the various ratios will provide an extremely smooth operation.

Another object of the invention is to provide fairly equally spaced speed ratios.

Our invention consists of the novel constructions, arrangements and devices to be hereinafter described and claimed for carrying out the above stated objects and such other objects as will appear from the following description of a preferred form of the invention illustrated in the accompanying drawing which is a diagrammatic illustration of a transmission.

The illustrated transmission comprises a drive shaft 10 and a driven shaft 11. The drive shaft 10 is adapted to be driven by the engine (not shown) of the vehicle in which the transmission is installed, and the driven shaft 11 is adapted to drive the rear driving road wheels (not shown) of the vehicle through any suitable drive connection (not shown).

The transmission comprises in general a planetary gear set 12, a second planetary gear set 13, two friction clutches 14 and 15 and three friction brakes 16, 17 and 18.

The planetary gear set 12 comprises a sun gear 19, a ring gear 20, a plurality of planet gears 21 in mesh with the sun gear 19 and the ring gear 20, and the planet gear carrier 22. The planetary gear set 13 comprises a sun gear 23, a ring gear 24, a plurality of planet gears 25 in mesh with the sun gear 23 and the ring gear 24, and the planet gear carrier 26 which is connected to the driven shaft 11. The sun gear 23 is connected to the sun gear 19 by means of a quill shaft 27.

The friction clutch 14 comprises the clutch disc 28 which is connected to the gear carrier 22 of the gear set 12 and the ring gear 24 of the gear set 13 by means of the shaft 29. The clutch 14 further comprises a pressure plate 30 which is connected to the drive shaft 10. The clutch 14 also comprises a fluid pressure actuated piston 31 which grips the clutch disc 28 between the pressure plate 30 and the piston 31.

The friction clutch 15 comprises the clutch disc 32 which is connected to the ring gear 20 by means of a quill shaft 33 which is rotatably disposed on the shaft 29. The clutch 15 also comprises a pressure plate 34 which is connected to the drive shaft 10, and a fluid pressure actuated piston 35 which grips the clutch disc 32 between the pressure plate 34 and the piston 35.

The friction brake 16 comprises the brake band 36 engageable on the brake drum 37. The brake drum 37 is attached to the quill shaft 33 and forms part of the connection between the ring gear 20 and the clutch disc 32.

The friction brake 17 comprises the brake band 38 engageable on the brake drum 39. The drum 39 is connected to the planet gear carrier 22, the shaft 29 and the ring gear 24. Therefore the brake 17 is effective to brake the planet gear carrier 22 and the ring gear 24.

The brake 18 comprises the brake band 40 engageable on the brake drum 41. The brake drum 41 is connected to the quill shaft 27 and forms part of the connection between the sun gears 19 and 23. The shaft 27 is rotatably disposed on the shaft 29.

In operation the transmission provides low, intermediate, direct and overdrive forward speed drives and a drive in reverse. The transmission when the clutches 14 and 15 and the brakes 16, 17 and 18 are all disengaged is in a neutral condition, and the shaft 11 is not driven from the shaft 10 when the latter is driven. Low speed forward drive, which may be referred to as first speed, is completed by engaging the clutch 15 and the brake 18. Power flows from the drive shaft 10 through the clutch 15 and the shaft 33 to the ring gear 20. The brake 18 holds the sun gear 19 so that the sun gear 19 functions as a reaction element for the gear set 12. The ring gear 20 drives the planet gears 21 causing them to planetate around the sun gear 19 and drive the carrier 22 and the ring gear 24 which is connected to the gear carrier 22 at a reduced speed with respect to the ring gear 20 and the drive shaft 10. The brake 18 also holds the sun gear 23 against rotation so that the sun gear 23 serves as the reaction element for the gear set 13. Power flows from the ring gear 24 to the planet gears 25 causing them to planetate around the sun gear 23 and causing the planet gear carrier 26 and the driven shaft 11 connected thereto to be driven in a forward direction and at a still greater reduced speed with respect to the drive shaft 10. It will be noted that the speed ratio achieved through this combination is the product of the two reductions between the two planetary gear sets.

Intermediate forward speed drive, which may be referred to as second speed, is completed by disengaging the clutch 15, engaging the clutch 14 and allowing the brake 18 to remain engaged. Power flows from the drive shaft 10 through the clutch 14 and the shaft 29 to the ring gear 24 of the gear set 13. The brake 18 holds the sun gear 23 against rotation so that the sun gear 23 functions as the reaction element for the gear set 13. Power flows from the ring gear 24 to the planet gears 25 causing them to planetate around the sun gear 23 and drive the planet gear carrier 26 and the driven shaft 11 connected thereto. It will be noted in this case that the gear set 12 is not used to transmit power to the driven shaft 11.

Direct forward speed drive through the transmission is completed by disengaging the brake 18, engaging the clutch 15 and allowing the clutch 14 to remain engaged. Power is transmitted from the drive shaft 10 through the clutch 14 and the shaft 29 to the planet gear carrier 22 of the gear set 12 and to the ring gear 24 of the gear set 13. Power is also transmitted from the drive shaft 10 through the clutch 15 and the shaft 33 to the ring gear 20. Since two elements of the gear set 12 are driven at the same speed all the elements thereof rotate as a unit. Since two elements of the gear set 13 are connected to two elements of the gear set 12 all the elements of the gear set 13 rotate as a unit and at the same speed as the elements of the gear set 12 and the drive shaft 10. Therefore, the two locked gear sets are in effect a coupling between the drive shaft 10 and the drive shaft 11 so as to give a direct drive between the two shafts.

The overdrive forward speed drive through the transmission is completed by disengaging the clutch 15, engaging the brake 16 and allowing the clutch 14 to remain engaged. Power flows from the drive shaft 10 through the clutch 14 and the shaft 29 in two paths. Power flows in one path from the shaft 29 to the gear carrier 22 of the gear set 12 and in another path to the ring gear 24 of the gear set 13. The brake 16 holds the ring gear 20 against rotation so that the ring gear 20 functions as the reaction element for the gear set 12. Power flows from the gear carrier 22 to the planet gears 21 causing them to planetate within the ring gear 20 and to drive the sun gear 19 and the sun gear 23 connected to the sun gear 19 at a fast overdrive speed with respect to the gear carrier 22 and the drive shaft 10. Power flows from the sun gear 23 to the planet gears 25 causing the gear carrier 26 to be driven at a reduced speed with respect to the sun gears 23 and 19 but still at an overdrive speed with respect to the drive shaft 10. Power flows in another path from the shaft 29 to the ring gear 24 and thence to the planet gears 25 tending to drive the gear carrier 26 at a reduced speed with respect to the ring gear 24 and the drive shaft 10. The power is recombined in the planet gears 25. The net effect of this dual action by the sun gear 23 and the ring gear 24 on the planet gears 25 is to drive the gear carrier 26 at a speed which is the sum of the reduced overdrive speed produced by the sun gear 23 and the reduced speed produced by the ring gear 24. Thus the gear carrier 26 and the driven shaft 11 connected thereto are driven at an overdrive speed with respect to the drive shaft 10.

Reverse drive through the transmission is completed by engaging the clutch 15 and the brake 17. Power flows from the drive shaft 10 through the clutch 15 and the shaft 33 to the ring gear 20. The brake 17 holds the gear carrier 22 against rotation so that the gear carrier 22 functions as the reaction element for the gear set 12. Power flows from the ring gear 20 through the planet gears 21 to the sun gear 19 causing the sun gear 19 and the sun gear 23 connected thereto to be driven in a reverse direction at an overdrive speed. The brake 17 also holds the ring gear 24 of the gear set 13 so that the ring gear 24 functions as a reaction element for the gear set 13. Power is transmitted from the sun gear 23 to the planet gears 25 causing them to planetate within the ring gear 24 and to drive the gear carrier 26 and the driven shaft 11 connected thereto at a reduced speed with respect to the sun gears 23 and 19. The net effect with the particular gear sizes illustrated is that the driven shaft is driven in a reverse direction at a slightly reduced speed with respect to the drive shaft 10.

For the purposes of illustration only, a table is set forth below illustrating the speed ratios obtainable by the transmission with one particular size for each of the gears in the gear sets 12 and 13. The table also sets forth in tabular form the various brakes and clutches that are engaged to complete the various drives through the transmission.

| Speeds | C14 | C15 | B16 | B17 | B18 | Ratios |
|---|---|---|---|---|---|---|
| 1st | | On | | | On | 2.072 to 1.00 |
| 2d | On | | | | On | 1.50 to 1.00 |
| 3d | On | On | | | | 1.00 to 1.00 |
| 4th | On | | On | | | .534 to 1.00 |
| Rev | | On | | On | | 1.143 to 1.00 |

The particular numerical ratios for the various drives through this transmission are obtained when the gears have the following number of teeth:

| | Teeth |
|---|---|
| Sun gear 19 | 21 |
| Ring gear 20 | 55 |
| Sun gear 23 | 24 |
| Ring gear 24 | 48 |

It will be understood that gears with other numbers of teeth may be used if desired to obtain other numerically different speed ratios, all within the scope of the present invention.

This invention advantageously utilizes two simple planetary gear sets interconnected so as to provide four forward speed drives and a drive in reverse. Another advantage of the invention is that only two friction devices need be engaged at any one time to complete any of the desired speed ratios. Also in shifting from one speed ratio to another either in an up-shift pattern or a down-shift pattern only one new friction device need be engaged. Since all of the engaging devices are of the friction type, it is possible to gradually complete the various drives through the transmission and as a result have a smooth operation in shifting from one speed to another.

We wish it to be understood that our invention is not to be limited to the specific constructions and arrangements shown and described, except only insofar as the claims may be so limited, as it will be understood to those skilled in the art that changes may be made without departing from the principles of the invention. In particular we wish it understood that the gear sizes may be varied as desired from those above mentioned to give a variety of numerical speed ratios.

We claim:

1. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a clutch for connecting said ring gear of said first gear set with said drive shaft, and a brake for holding said sun gear of said first gear set, said sun gear of said first gear set and said sun gear of said second gear set being connected together, said gear carrier of said first gear set and said ring gear of said second gear set being connected together, said gear carrier of said second gear set being connected with said driven shaft, said clutch and brake when both are engaged completing a low speed forward drive from said drive shaft to said driven shaft.

2. In a transmission, the combination of a drive shaft, a driven shaft, a first planetary gear set and a second planetary gear set, said first gear set comprising a sun gear and a ring gear element and a planet gear in mesh with said sun gear and said ring gear element and a planet gear carrier element, said second gear set comprising a sun gear and a ring gear and a planet gear in mesh with the sun and ring gears and a planet gear carrier, a clutch to connect one of said elements of said first gear set with said drive shaft, and a brake for said sun gear of said first gear set, said gear carrier element of said first gear set and said ring gear of said second gear set being connected together, said sun gear of said first gear set and said sun gear of said second gear set being connected together, said gear carrier of said second gear set being connected with said driven shaft, said clutch and said brake when both are engaged completing a change speed drive from said drive shaft to said driven shaft.

3. In a transmission, the combination of a drive shaft, a driven shaft, a first planetary gear set and a second planetary gear set, said first gear set comprising a sun gear and a ring gear element and a planet gear in mesh with said sun gear and said ring gear element and a planet gear carrier element, said second gear set comprising a sun gear and a ring gear and a planet gear in mesh with said sun and ring gear and a planet gear carrier, a clutch for connecting one of said elements of said first gear set with said drive shaft, and a brake for the other of said elements of said first gear set, said sun gear of said first gear set and said sun gear of said second gear set being connected together, said gear carrier element of said first set being connected with said ring gear of said second gear set, said carrier of said second gear set being connected with said driven shaft, said clutch and said brake when both are engaged completing a change speed drive from said drive shaft to said driven shaft.

4. In a transmission, the combination of a drive shaft, a driven shaft, a first planetary gear set and a second planetary gear set, said first gear set comprising a sun gear element and a ring gear element and a planet gear in mesh with the sun and ring gear elements and a planet gear carrier, said second gear set comprising a sun gear and a ring gear and a planet gear in mesh with the sun and ring gears and a planet gear carrier, a clutch to connect said gear carrier of said first gear set with said drive shaft, and a brake for one of said elements of said first gear set, said carrier of said first gear set being connected with said ring gear of said second gear set, said sun gear element of said first gear set being connected with said sun gear of said second gear set, said gear carrier of said second gear set being connected with said driven shaft, said clutch and said brake when both are engaged completing a change speed drive from said drive shaft to said driven shaft.

5. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch to connect said ring gear of said first gear set with said drive shaft, a second clutch to connect said gear carrier of said first gear set with said drive shaft, a first brake for said sun gear of said first gear set, and a second brake for said ring gear of said first gear set, said gear carrier of said first gear set being connected with said ring gear of said second gear set, said sun gear of said first gear set being connected with said sun gear of said second gear set, said gear carrier of said second gear set being connected with said driven shaft, said first clutch and said first brake when both are engaged completing a low speed forward drive from said drive shaft to said driven shaft, said second clutch and said first brake when both are engaged completing a higher reduced speed forward drive from said drive shaft to said driven shaft, said second clutch and said second brake when both are engaged completing an overdrive speed forward drive from said drive shaft to said driven shaft.

6. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch to connect said ring gear of said first gear set with said drive shaft, a second clutch to connect said gear carrier of said first gear set with said drive shaft, and a brake for said sun gear of said first gear set, said gear carrier of said first gear set being connected with said ring gear of said second gear set, said sun gear of said first gear set being connected with said sun gear of said second gear set, said gear carrier of said second gear set being connected with said driven shaft, said first clutch and said brake when both are engaged completing a low speed forward drive from said drive shaft to said driven shaft, said second clutch and said brake when both are engaged completing a higher reduced speed forward drive from said drive shaft to said driven shaft, said first and second clutches when both are engaged completing a direct drive between said drive shaft and said driven shaft.

7. In a transmission, the combination of a drive shaft, a driven shaft, a first planetary gear set and a second planetary gear set, said first gear set comprising a sun gear and a ring gear and a planet gear in mesh with the sun and ring gears and a planet gear carrier, said second gear set comprising a sun gear element and a ring gear element and a planet gear in mesh with the sun and ring gear elements and a planet gear carrier, a clutch to connect said ring gear of said first gear set with said drive shaft and a brake for one of said elements of said second gear set, said gear carrier of said first gear set being connected with said ring gear element of said second gear set, said sun gear of said first gear set being connected with said sun gear element of said second gear set, said gear carrier of said second gear set being connected with said driven shaft, said clutch and said brake when both are engaged completing a change speed drive from said drive shaft to said driven shaft.

8. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said gear carrier of said first gear set with said drive shaft, a second clutch for connecting said ring gear of said first gear set with said drive shaft, a first brake for said ring gear of said first gear set, and a second brake for said gear carrier of said first gear set, said gear carrier of said first gear set being connected with said ring gear of said second gear set, said sun gear of said first gear set being connected with said sun gear of said second gear set, said gear carrier of said second gear set being connected with said driven shaft, said first and second clutches when both are engaged completing a direct drive between said drive shaft and said driven shaft, said first clutch and said first brake when both are engaged completing an overdrive speed forward drive from said drive shaft to said driven shaft, said second clutch and said second brake when both are engaged completing a reverse drive from said drive shaft to said driven shaft.

9. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said gear carrier of said first gear set with said drive shaft, a second clutch for connecting said ring gear of said first gear set with said drive shaft, a first brake for said sun gear of said first gear set, and a second brake for said ring gear of said first gear set, said gear carrier of said first gear set being connected with said ring gear of said second gear set, said sun gear of said first gear set being connected with said sun gear of said second gear set, said gear carrier of said second gear set being connected with said driven shaft, said second clutch and said first brake when both are engaged completing a reduced speed forward drive from said drive shaft to said driven shaft, said first clutch and said first brake when both are engaged completing a higher reduced speed forward drive from said drive shaft to said driven shaft, said first and second clutches when both are engaged completing a direct drive between said drive shaft and said driven shaft, said first clutch and said second brake when both are engaged completing an overdrive speed forward drive from said drive shaft to said driven shaft.

10. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a clutch for connecting said gear carrier of said first gear set with said drive shaft, a brake for said ring gear of said first gear set, said gear carrier of said first gear set being connected with said ring gear of said second gear set, said sun gear of said first gear set being connected with said sun gear of said second gear set, said gear carrier of said second gear set being connected with said driven shaft, said clutch and brake when engaged completing an overdrive speed forward drive from said drive shaft to said driven shaft.

11. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a clutch for connecting said ring gear of said first gear set with said drive shaft, and a brake for holding said gear carrier of said first gear set, said sun gear of said first gear set and said sun gear of said second gear set being connected together, said gear carrier of said first gear set and said ring gear of said second gear set being connected together, said gear carrier of said second gear set being connected with said driven shaft, said clutch and said brake when both are engaged completing a reverse drive from said drive shaft to said driven shaft.

No references cited.